Dec. 22, 1970

C. L. MATSON 3,549,194

ANCHORING DEVICE FOR CAMPER BODY

Filed Aug. 8, 1968

INVENTOR.
CLAYTON L. MATSON

BY

J.F. Cuneo

ATTORNEY

Dec. 22, 1970   C. L. MATSON   3,549,194
ANCHORING DEVICE FOR CAMPER BODY
Filed Aug. 8, 1968   3 Sheets-Sheet 3

INVENTOR.
CLAYTON L. MATSON
BY
*J. F. Cuneo*

ATTORNEY

United States Patent Office 3,549,194
Patented Dec. 22, 1970

3,549,194
ANCHORING DEVICE FOR CAMPER BODY
Clayton L. Matson, 1121 N. Viceroy Ave.,
Covina, Calif. 91722
Filed Aug. 8, 1968, Ser. No. 751,083
Int. Cl. B60p 7/08
U.S. Cl. 296—23
6 Claims

ABSTRACT OF THE DISCLOSURE

An anchoring device having a downwardly and outwardly extending arm secured to a clamping arrangement that is attachable to the upper rail of a pick-up truck bed, including an adjustable tensioning member that is attached at one end to the lower end portion of the arm of the anchoring device and having its other end atached to an engageable fixture secured to the camper body.

---

This invention relates to an anchoring device and particularly to a device for securing a pick-up camper body or shell to a truck bed without the necessity of making additional holes in the truck bed or making use of any of the openings or fixtures that are sometimes provided in the bed portion of the pick-up body.

Camper bodies have been heretofore secured to the bed of a pick-up truck by sometimes utilizing tie rods or wires that extend over the side of the truck bed and are attached to the lower portions of the truck; these tie rods or wires are unsightly and often fail to securely anchor the camper. Another method that has been used is to drill a number of corresponding holes in the floor of the camper body and in the truck bed and bolting the camper body to the bed through the matching holes. Access to all of the bolts is usually difficult and mounting the camper body to a truck bed in this manner can be very time consuming. The same problem is encountered whenever the camper body must be removed from the truck. It is furthermore not desirable to drill a number of holes in the pick-up bed particularly on the modern streamlined types of truck beds and frequently owners refuse to permit such drilling particularly in the substantially flat top rails with which modern trucks are equipped. These rails usually extend from the front to the rear of the bed of the pick-up.

One object of this invention is to make available a truck camper body anchoring device that can be securely attached at any desired position along the top rail of a pick-up body without the necessity of drilling any holes in the pick-up bed, and likewise does not depend on the presence of special members or hollow reinforcements such as are sometimes located in the vertical side of the truck bed to make the device operative.

Another object is to provide a camper anchoring device that is inconspicuous when installed to the truck bed, and can easily and conveniently be reached when required to secure the device anywhere along the top rail of the pick-up bed.

A further object is to provide a camper anchoring device that can be attached to any truck having a top rail regardless of whether the top rail extends inwardly or outwardly from the upper end of the vertical portion of the pick-up bed.

An added object of this invention is to provide a simple, light weight, dependable anchoring device that can be easily and economically fabricated.

Other objects and features of this invention will become apparent from the accompanying drawings and detailed description that follows, in which.

Figure 3:
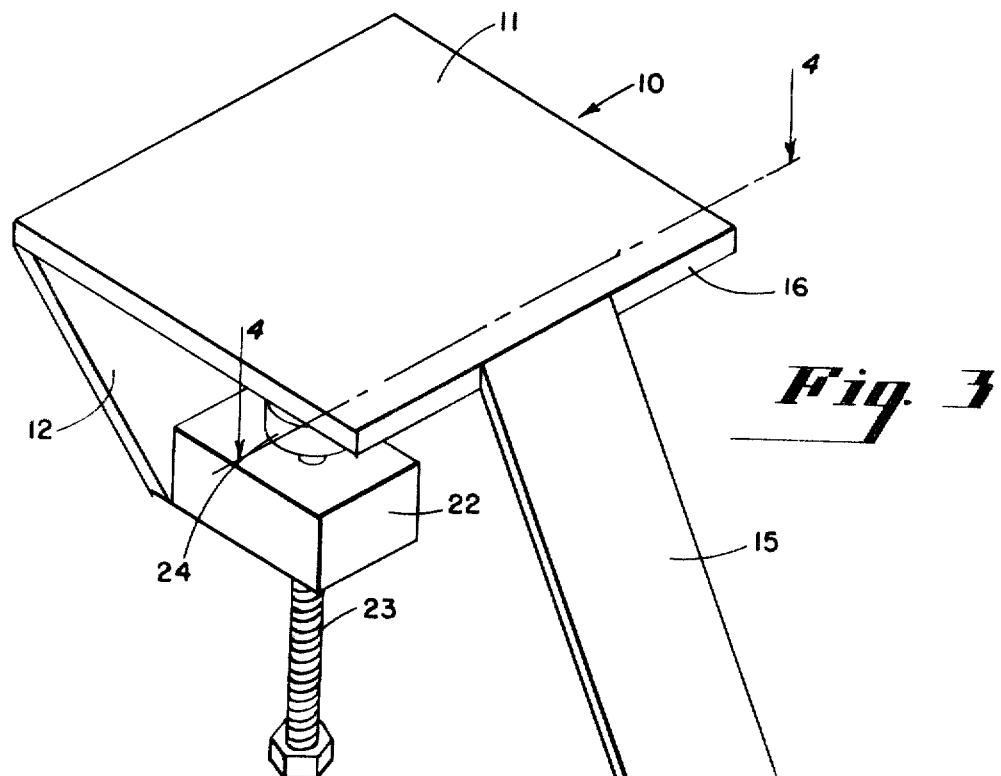
FIG. 3 is an isometric view of one embodiment of the anchoring device.
Figure 5:
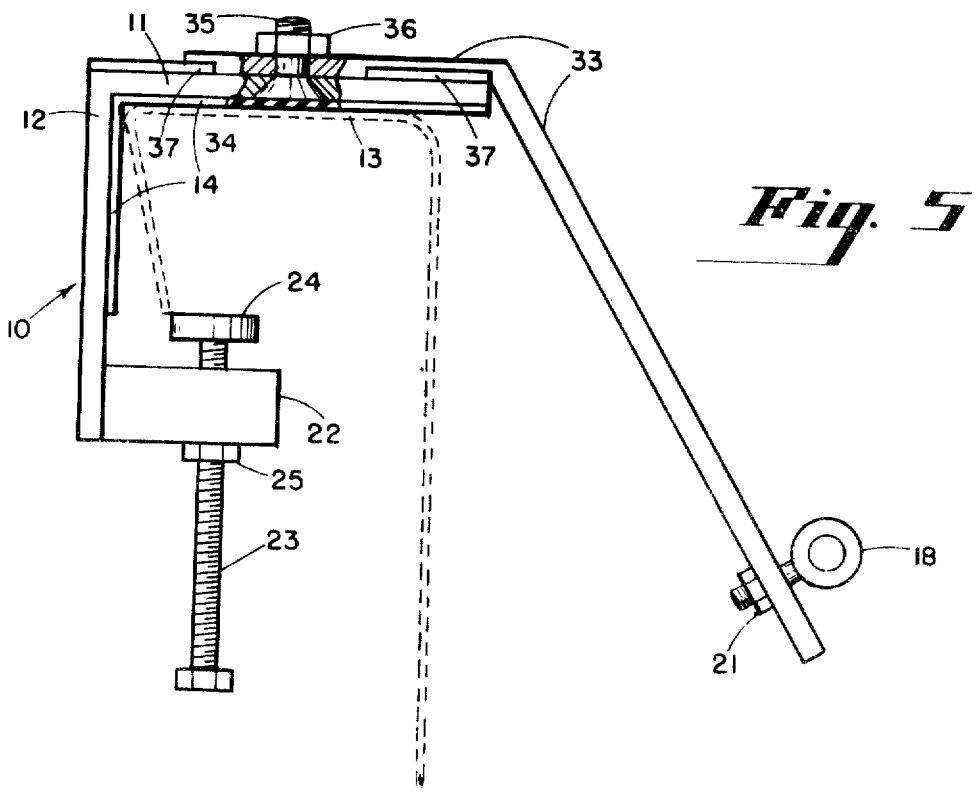
FIG. 5 is a side elevational view, partly in cross section showing a modification of the anchoring device shown in FIG. 3 that is adaptable to a truck bed having either an inwardly or an outwardly directed top rail extending from the upper end of the vertical side of the truck bed.

Referring to the drawings there is shown in FIG. 3, one embodiment of the anchoring device that comprises angle member 10 having a first side portion 11 and a second side portion 12 that are substantially normal to each other. The lower surface of side 11 rests on top rail 13 of a truck bed such as shown in FIG. 5 by the dotted lines. If desired a pad 14 may be employed between the top of rail 13 of the truck bed and the lower surface of side 11 of the angle member to prevent the anchoring device from scratching the finish on the rail of the truck bed and to help secure the angle member more solidly to the otherwise shiny surface of the top rail. Pad 14 can be any suitable material such as treated fabric, rubber, cork or other elastomeric material that can be compressed easily.

Figure 1:
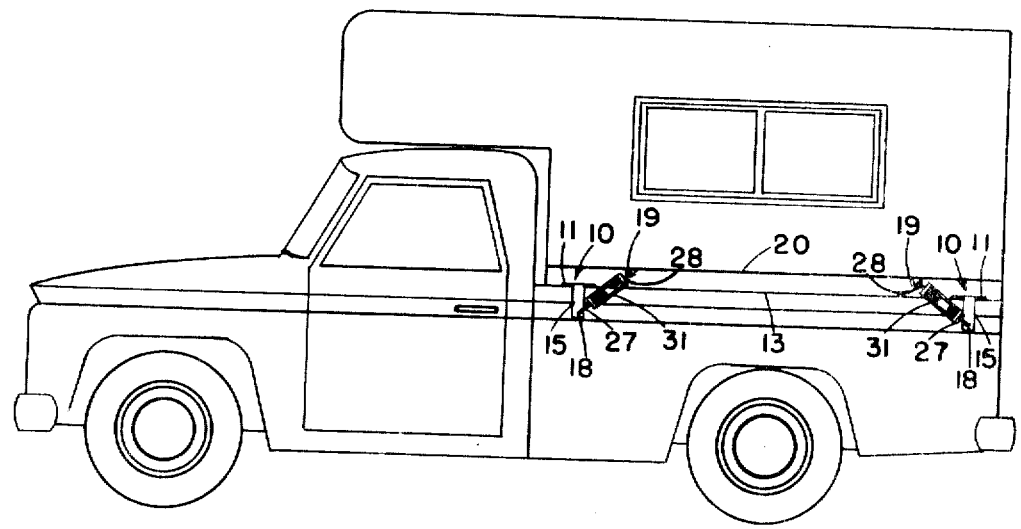
FIG. 1 is a side elevational view of a pick-up truck with a camper body mounted thereon and secured to the pick-up bed by the anchoring devices according to this invention.
Figure 2:
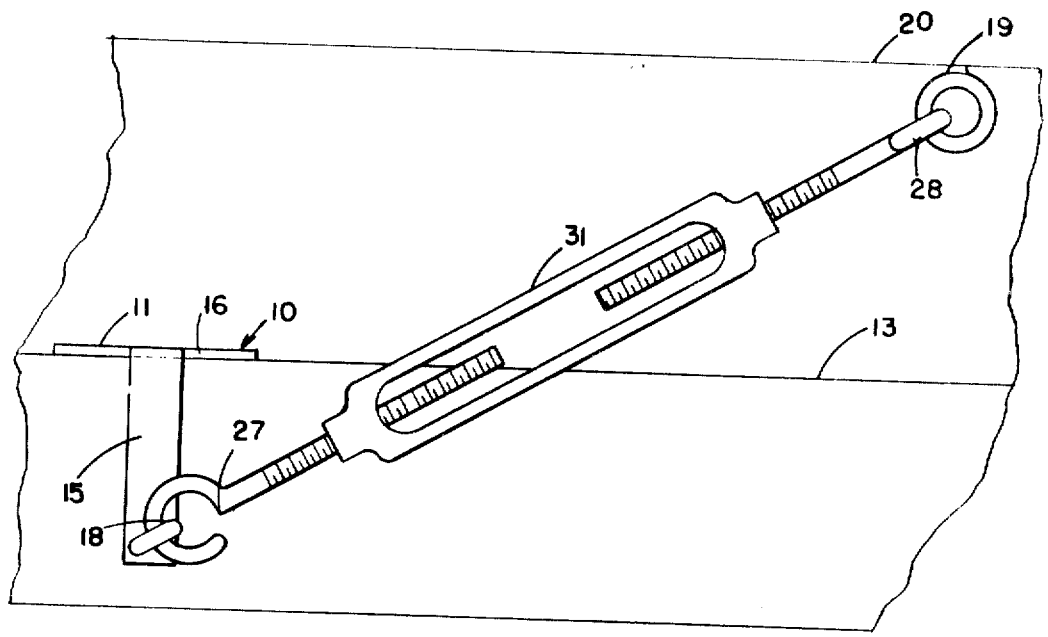
FIG. 2 is an enlarged fractional view showing the anchoring device shown in FIG. 1, including a portion of the truck bed having an inwardly extending top rail, and a portion of the camper body.
Figure 6:
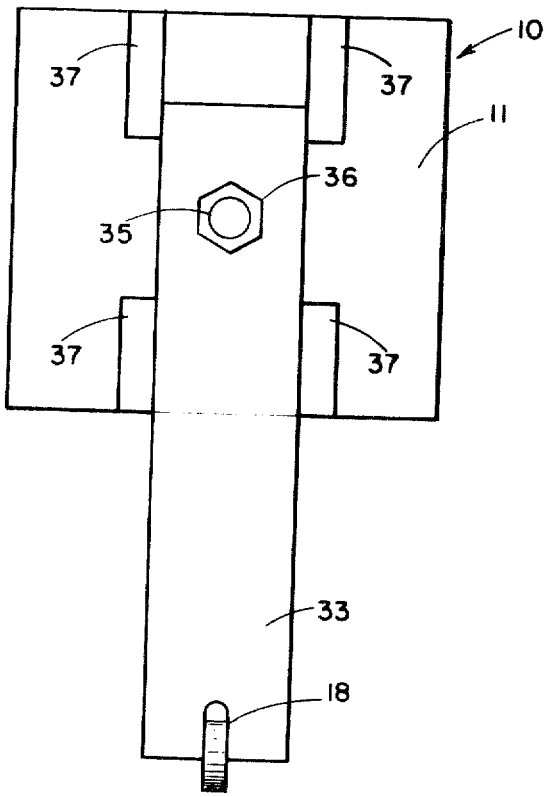
FIG. 6 is a top plan view of the device shown in FIG. 5.

An arm 15 extends from edge 16 of side 11 that is opposite to side portion 12. Arm 15 extends outwardly and downwardly from edge 16 and from the side of the truck bed, a suitable distance as shown in FIGS. 3, 5 and 6. In FIG. 3 arm 15 is rigidly secured to edge 16 and is narrower in width than edge 16. Arm 15 is provided near its lower end 17 with a securing device such as a ring bolt 18 that is secured to arm 15 by means of a threaded bolt and can be locked in position when it has been properly oriented wtih a cooperating ring 19 that is secured to the underside of the camper body overhang 20 as shown in FIG. 2, by means of a locking nut 21. If desired the ring bolt could be omitted and the orifice in which the ring bolt would normally be threaded, could be used to support one end of the anchoring device shown in FIG. 2.

Figure 4:
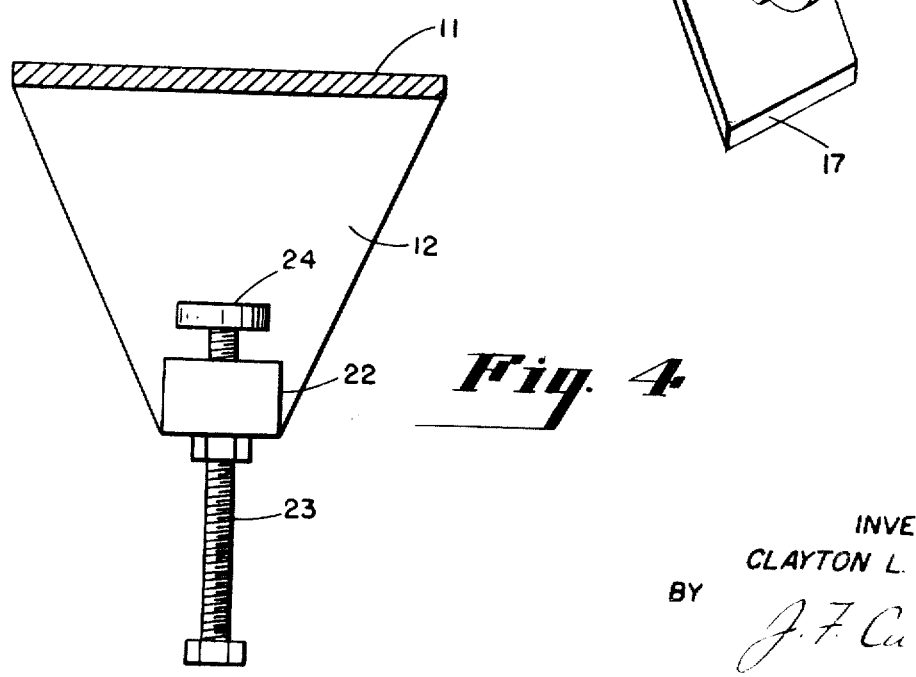
FIG. 4 is a view, partly in cross section, taken on line 4—4 of FIG. 3 to more clearly show the clamping device employed.

A projecting member 22 is secured to and extends at substantially right angles from second part 12 of the angle member from the lower portion thereof as shown in the drawings thereby placing projection 22 in spaced relationship with the lower surface of side 11 and substantially parallel to it. The upper portion of member 22 supports the clamping means which in FIGS. 3 and 4 is shown as a screw clamp 23 having a preferably rotatable head 24 to prevent it from turning when it is tightened. The outer portion of projection member 22 is provided with a cooperating threaded bore to receive the threaded portion of screw clamp 23. While the clamping arrangement is shown as a screw clamp for convenience of illustration it is intended that the clamping device could be a conventional form of clamp actuated by cams or by levers that would securely grip rail 13.

The manner in which the device is used is as follows: each angle member of the anchoring devices is placed on pad 14 located at the desired position on top of rail 13. Pad 14 prevents the surfaces of sides 11 and 12 adjacent the truck bed and rail from marring the finish of the truck bed, as shown in FIG. 5. The bolt portion of screw clamp 23 is turned in projection member 22 until head 24 is placed in tight engagement with the bottom of rail 13. A lock nut 25 is then threaded on the bolt portion of screw clamp 23 until it is tight against the bottom of projection member 22 and will prevent screw clamp 23 from loosening its grip on top rail 13 when the truck bed is subjected to the customary jars and vibration. One end of a turnbuckle 26, preferably a ring secured to ring bolt 18 or a rounded hooklike member 27, is connected to ring bolt 18. The other end of turnbuckle 26 is also provided with a hook 28 that can be made to engage ring 19 extending from the lower surface of the overhang of the camper body. When ring bolt 18 has been correctly alined with ring 19 on the camper body, locking nut 30 at the lower end of ringbolt 18 is tightened against the lower surface of arm 15 to eliminate any looseness. Open link 31 of the turnbuckle is turned until the camper body is tightly secured to the truck bed. Usually a complete installation will require four of the anchoring devices, a pair of these being located on each side, and each anchoring device will be pulling in a direction that will be opposed to that of the adjacent anchoring device on that side. The camper body is thus securely fastened to the truck bed.

FIGS. 5 and 6 illustrate a modification of the device that is shown in FIGS. 3 and 4. In some truck beds the downwardly extending portion of top rail 13 is located on the outside of the bed instead of on the inside making it necessary for arm 15 to extend outwardly and downwardly from the downwardly extending portion of top rail 13 instead of from the vertical side of the truck bed as before. This is easily accomplished with the modification shown in FIG. 5 by simply reversing the position of adjustable arm 33 that is provided with a clearance hole 34 that slips over stud 35 which is secured to the upper surface of side 11 of the angle member. A nut 36 holds arm 33 in contact with side 11 and to prevent arm 33 from moving radially the upper surface of side 11 is provided with a number of stops, preferably four in number, designated by the numeral 37. Stops 37 are positioned so that arm 33 will be snugly seated between them when it is securely bolted to the top of side 11.

All that has to be done to properly locate the anchoring device to a truck bed that has a reversed upper rail is to secure the angle member to the rail as described previously and then the arm 33 will be placed so that it extends outwardly and downwardly from the side of the truck bed between the stops 37. When bolt 35 and nut 36 are in engagement with arm 33, arm 33 will become a rigid part of the anchoring device.

While one embodiment of the novel camper anchoring device and one modification have been described in detail herein, it is intended that various changes and further modifications may be made without departing from the scope of the invention.

I claim:
1. An anchoring device for securing a camper body to the bed of a pick-up truck having top rails extending the length of the truck bed, comprising: an angle member having a first side that is at least the width of said top rail and a second side that is substantially normal to the first side and secured to said first side; an arm secured to said first side of the angle member, said arm extending outwardly and downwardly from the edge of said first side that is opposite said second side and from the upper edge of the side of the bed of said truck body; a projecting member extending from said second side in spaced relationship with said first side and substantially parallel thereto, the projecting member being substantially normal to said second side; clamping means associated with said projecting member to engage the lower surface of said top rail when said first side is resting on the upper surface of said top rail; and an adjustable tension means secured at one extremity to the lower end of said arm and having its other extremity attached to the camper body mounted on said pick-up bed.

2. An anchoring device for securing a camper body to the bed of a pick-up truck according to claim 1, wherein the clamping means comprises a threaded member that engages the threaded portion of a bore in said projecting member, the axis of the threaded bore being perpendicular to the longitudinal axis of the projecting member and to the first side of the angle member, the end of the threaded member adjacent said first side being provided with a contact surface that is larger in cross section than said threaded member, the opposite end of the threaded member being provided with means for rotating said threaded member in said threaded bore in the projecting member.

3. An anchoring device for securing a camper body to the bed of a pick-up truck according to claim 1, wherein the lower end portion of said arm is provided with a threaded bore, a ringbolt having matching threads that are engageable by said threaded bore, means associated with said threaded ringbolt for locking said ringbolt to said arm when the ringbolt is in the required position, and wherein the adjustable tension means is a turnbuckle having threaded rods engageable by the threaded end portions of the open link thereof, the external end portion of each of said rods being provided with a hook, one of said hooks being engageable by the ring of said ringbolt and the other hook being engageable by a ring secured to the camper body when the anchoring device and the camper body are mounted on said truck bed.

4. An anchoring device for securing a camper body to the bed of a pick-up truck according to claim 1, wherein the outwardly and downwardly extending arm is rigidly secured to the edge of said first side of the angle member that is opposite to said second side thereof.

5. An anchoring device for securing a camper body to the bed of a pick-up truck according to claim 1, wherein a threaded extension is substantially centrally secured to said first side and projects outwardly from the upper surface thereof, the axis of said threaded extension being perpendicular to said first side, said arm being provided at one end with an integral flat portion that forms an obtuse angle with the downwardly and outwardly extending portion of said arm, said flat portion being provided with a bore through which said threaded extension can pass when said flat portion is resting on said first side of the angle member, and means engageable by the threaded extension to securely affix said flat portion of the downwardly and outwardly extending arm to said first side.

6. An anchoring device for securing a camper body to the bed of a pick-up truck according to claim 5, wherein stops are provided on the upper surface of said first side the stops being positioned to snugly receive the sides of the flat portion of said arm.

References Cited
UNITED STATES PATENTS 3,454,253  7/1969  Lippiatt _____ 296—23(MC)

PHILIP GOODMAN, Primary Examiner

U.S. Cl. X.R.

248—361